UNITED STATES PATENT OFFICE.

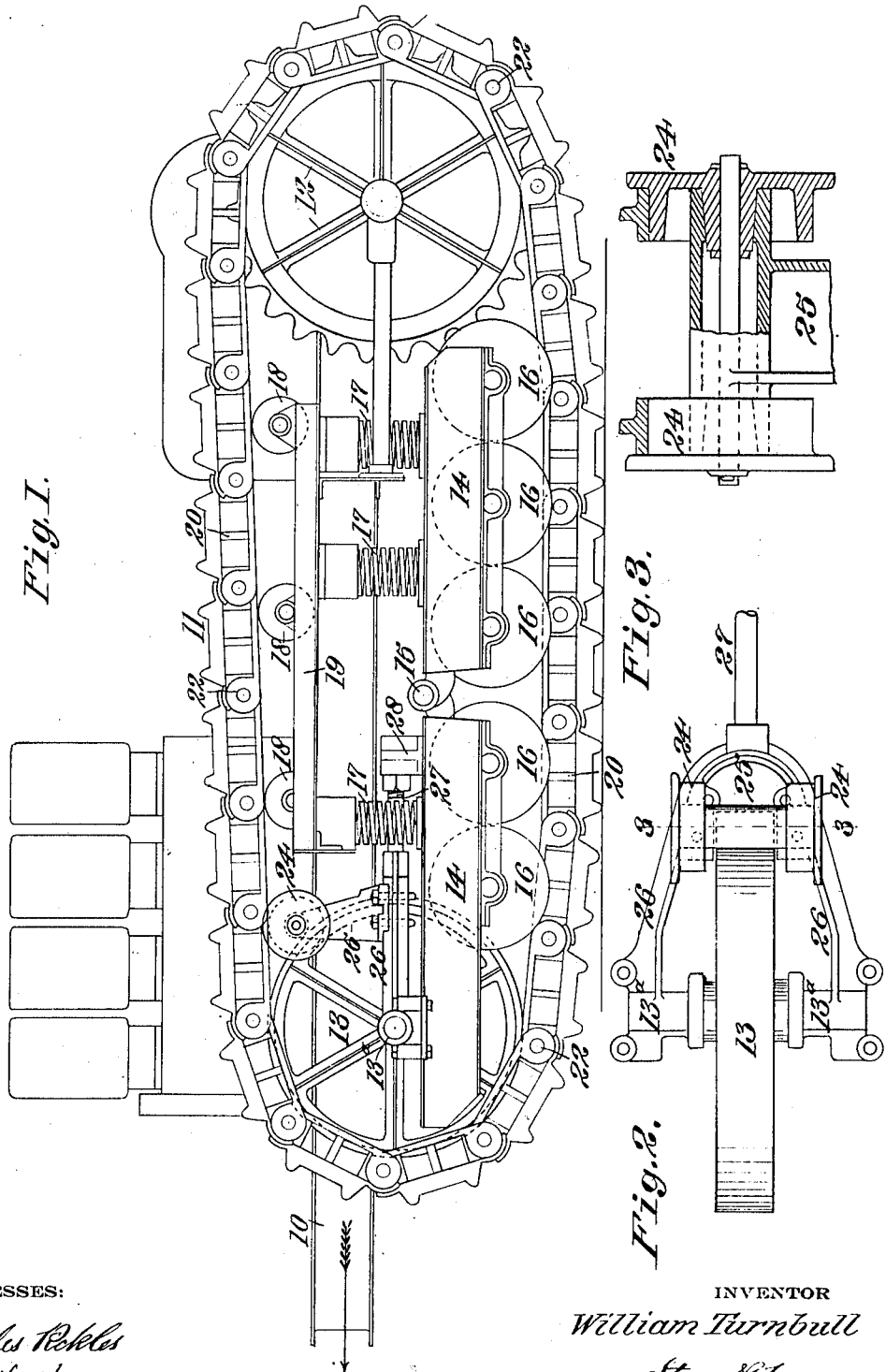

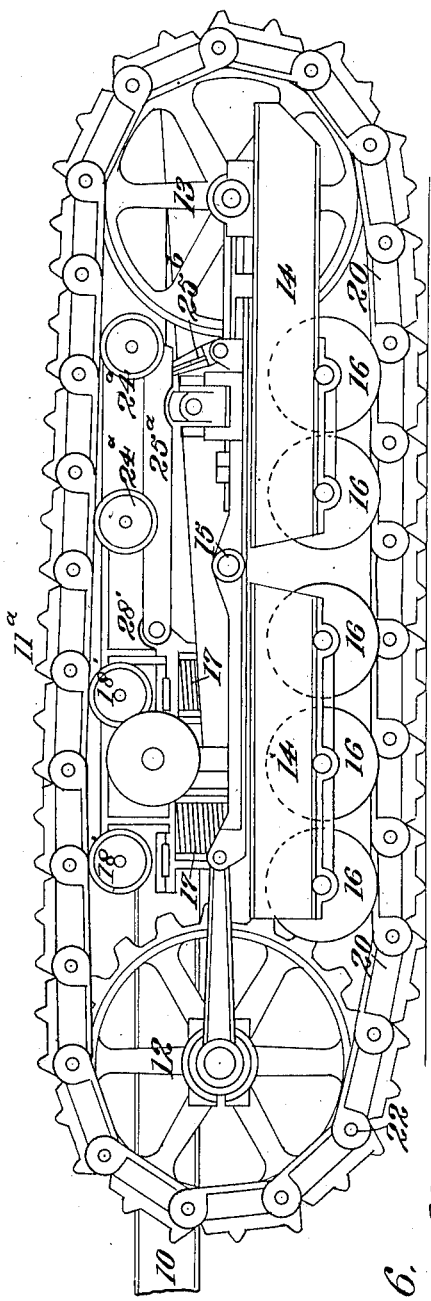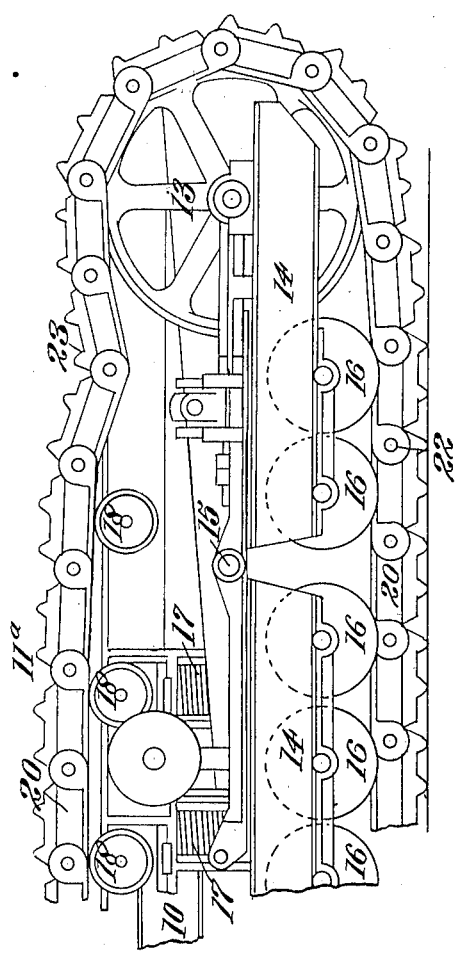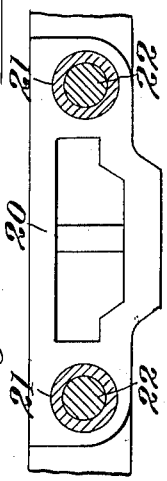

WILLIAM TURNBULL, OF STOCKTON, CALIFORNIA, ASSIGNOR TO THE HOLT MANUFACTURING COMPANY, OF STOCKTON, CALIFORNIA, A CORPORATION OF CALIFORNIA.

ANTIVIBRATING MEANS FOR SELF-LAYING TRACKS.

1,314,621.   Specification of Letters Patent.   Patented Sept. 2, 1919.

Application filed December 11, 1916. Serial No. 136,208.

*To all whom it may concern:*

Be it known that I, WILLIAM TURNBULL, a citizen of the United States, residing at Stockton, in the county of San Joaquin and State of California, have invented new and useful Improvements in Antivibrating Means for Self-Laying Tracks, of which the following is a specification.

This invention relates to endless link track vehicles and tractors and has for its object to eliminate wear and slack of the links of the chain track when coming in contact with the blank idler wheel on the truck frame.

In this type of machine there are employed front and rear sprockets; the rear sprocket being the drive sprocket, the front or idler sprocket being blank and serving as a guide to conduct the track around the truck and beneath the supporting truck rollers in which the machine is carried. In all cases the tension to drive the machine is applied from the drive sprocket along the ground run of the track belt beneath the truck rollers, leaving more or less sag or slack in the upper idle portion of the track belt.

In this construction there is a tendency especially when the chain has stretched, for the links to strike the blank idler wheel with some force, resulting in increased wear of the parts and causing considerable noise and clatter. Although the upper run of the chain is ordinarily supported upon guide rollers carried on the main tractor frame between the sprockets, necessarily these upper guide rollers being arranged some distance from the idler wheel and being movable relatively thereto, are ineffective to overcome the forcible striking of the links against the wheel and consequent vibration.

I have discovered that by arranging a roller or other suitable guide means comparatively close to the central point of the upper portion of the idler wheel and mounting such roller in a fixed position relatively to the idler wheel support, this slapping of the links against the wheel is overcome, and a desired tangential engagement of the links with the wheel is produced which results in a noiseless operation and reduces considerably the wear upon the parts.

One form which my invention may assume is exemplified in the following description and illustrated in the accompanying drawings, in which—

Figure 1 shows a side elevation of a tractor embodying my invention.

Fig. 2 shows a plan view of the idler wheel and associated guide roller detached.

Fig. 3 shows a sectional view on the line 3—3 of Fig. 2.

Fig. 4 shows a diagram of a roller mechanism and endless chain therefor, illustrating the backlash and tendency of the chain to sag and slap against the idler wheel.

Fig. 5 represents a modification of the invention.

Fig. 6 is a detail section of a track link pivotal connection.

In the drawings, I show a conventional form of tractor, embodying a main frame 10 equipped with a roller truck mechanism comprising an endless chain track 11, carried upon a rear driving sprocket wheel 12, journaled upon the main frame, and a front blank idler wheel 13 journaled upon a roller truck frame 14, usually made in two articulated sections connected pivotally together at 15 and carrying a series of rollers 16 resting upon the bottom run of the chain track. The main frame is in this type of machine supported by means of springs 17 upon the roller truck frame. A series of guide rollers 18 is arranged beneath the upper run of the chain track for supporting the same, and said rollers are carried upon longitudinally arranged bars 19 secured rigidly to the main frame 10. These rollers 18 are generally arranged some distance from each of the wheels 12 and 13 and in a plane slightly below a line tangential to the upper portions of both wheels.

The chain track is made up of a series of articulated link sections, each comprising parallel side bars 20, the side bars of alternate links being connected together by gudgeon blocks 21 and the intermediate links being connected to the alternate links by means of pins 22 passing through the gudgeon blocks. The gudgeon blocks 21 engage the teeth on the sprocket-wheel 12, whereby the chain track is driven, and contact also with the periphery of the blank idler wheel 13, whereas the side bars straddle the rims of both wheels; the bottom edges of the side bars on the upper run of the track being adapted to engage the guide rollers 18.

As will be seen in Fig. 4, the chain track has a tendency to sag at the point 23 adjacent to the blank idler wheel, where there is no support between the nearest roller 18 and the central point of the upper portion of the idler wheel. Therefore, the gudgeon blocks 21 strike the rim of the idler wheel in a direction somewhat radial thereto instead of tangential, as is desired. The effect of this will be to permit a forcible collision between the idler wheel and links, which causes a clattering noise and results in a quick wearing of the links. This clash will be increased when the main frame and rollers 18 move relatively to the idler wheel 13 and its support.

I arrange guide rollers 24 one on either side of the wheel 13 comparatively close to the central point of the upper portion of the wheel and journal these rollers upon a standard 25, carried on a forked arm 26, the latter connected to and preferably formed integrally with the journal boxes 13ª of the blank idler wheel. The rollers 24 are flanged on their exterior sides and receive the chain between them and are preferably arranged with their upper surfaces a trifle higher than the upper surface of the blank idler wheel. The forked arm 26 serves also as a push-rod for the articulated truck frame 14, being connected thereto by a rod 27 having an adjustable connection 28 with the truck frame.

By reason of this arrangement the chain is supported at a point comparatively close to the center of the upper portion of the idler wheel, and this support is movable with the wheel support. The operation is indicated in Fig. 5 where it will be seen that the links comprising the chain, come into engagement with the idler wheel in a downwardly and forwardly inclined direction and tangential to the wheel. The clash is thus eliminated as is also excessive wear. There will be no forcible collision between the links of the chain and the rollers 24 on account of the different manner in which the links engage the rollers. Here the bottom edges of the side bars 20 rest at all times upon the peripheries of the rollers 24, while on the idler wheel 13 only the gudgeon blocks 21 engage with the periphery and the side bars straddle the rim. Also, the links of the chain are tilted at this point, as shown in the diagram, and thus any tendency for the chain to sag is removed. The fact that the rollers 24 are somewhat closer to the adjacent roller 18 than the central point of the upper portion of the idler wheel also prevents any sagging of the chain, the rollers 24 in effect bridging the space which formerly existed between the idler wheel and the adjacent guide roller 18.

It will be noted that the distance between the rollers 24 and the central point on the upper portion of the idler wheel rim is less than the length of one link section, and, therefor, the chain cannot by any possibility sag so as to permit the links to slap the rim of the idler wheel. These parts being fixed relatively to each other will insure the proper engagement of the links with the idler wheel at all times, regardless of any rocking or oscillation of the roller truck frame.

In Fig. 5 I have shown a modification of the same idea as illustrated in my copending application Serial No. 77,382, filed February 10, 1916.

In this case 18′ represents the stationarily supported rollers on the main frame supporting the major portion of the upper run of the track 11ª; and 24ª represent floating guide rollers corresponding to roller 24 of Fig. 1, mounted on a lever 25ª, which is pivoted at one end of the frame at 28′ and the opposite end is supported yieldingly on the forward truck section by means of pivoted link 25ᵇ.

The design of Figs. 1 and 2 present an advantage over that of Fig. 5, because the adjustable guide roller or floating roller 24 may be placed much closer to the point of contact of the front idler in the former than in the latter. Furthermore, in order to get the best result I find it preferable to mount the floating roller 24 directly upon the forked push rod 26; or rather, in order to support most advantageously, the roller 24 and see that it is always carried forward or moved backward in unison with the front idler or blank sprocket 13, as it is necessary from time to time to adjust the bearings of the wheels 13 as the belt stretches to employ a forked push rod which will act to move both bearings for the wheel 13 in unison and then to attach the arms 25 in which the roller 24 is journaled, directly on the arms of the bifurcated or forked push rod 26. As the double roller 24 has a reduced central portion to accommodate wheel 13, this double roller is enabled to straddle the wheel 13, and at the same time by reason of its mounting on the push rod, to maintain a uniform relation both to the wheel 13 and the track.

In either form of the device, as shown in Figs. 1 and 5, the track is supported adjacent to the front sprocket by means of one or more floating rollers which are so mounted as to move vertically or approximately so, in accordance with the vertical movements of the front of the truck; this form of cushioning means, whether that shown in Fig. 1 or Fig. 5 or embodied in any equivalent construction, providing in effect a cushioning device and tangential support for the track immediately adjacent the point where it is received onto the front or idler sprocket.

It will be understood that various changes in the construction and arrangement of the several parts may be made without departing from the spirit and principle of the invention.

Having thus described my invention, what I claim and desire to secure by Letters Patent is—

1. In a tractor truck mechanism, an endless chain track, a driving wheel for said chain, an idler wheel for said chain, and means to support the upper run of the chain at a point separated from the central point of the upper portion of the idler wheel by less than the length of one link section.

2. In a tractor truck mechanism, an endless chain track, a driving wheel for said chain, an idler wheel for said chain, and means fixed relatively to the idler wheel engaging and supporting the upper run of the chain at a point overlying said wheel, to cause the links to contact with said wheel at a tangent thereto.

3. In a tractor truck mechanism, an endless chain track, a driving sprocket wheel therefor, a blank idler wheel for said chain, and means to support the upper run of the chain adjacent to said idler wheel at a point between the vertical, central line thereof and a vertical line tangential to the inner portion of the wheel, whereby to cause the links to engage tangentially with the idler wheel.

4. In a tractor truck mechanism, an endless chain track, a driving sprocket wheel therefor, a blank idler wheel for said chain, a movable support for said idler wheel, and means fixed relatively to the movable support located at a point between the vertical, central line of said idler wheel and a vertical line tangential to the inner portion of the wheel to support the upper run of the chain, whereby to cause the links to engage tangentially with said wheel.

5. In a tractor truck mechanism, an endless chain track, a driving sprocket wheel therefor, a blank idler wheel for said chain, and means slightly above and adjacent to the central point of the upper portion of the idler wheel to support the chain, whereby to cause the links to engage the wheel tangentially in a rearwardly and downwardly inclined direction.

6. In a tractor truck mechanism, an endless chain track, a driving sprocket wheel therefor, a blank idler wheel for said chain, a movable support for said idler wheel, a roller to support the upper run of the chain at a point adjacent to the idler wheel, and supporting means for the roller fixed relatively to said movable support.

7. In a tractor truck mechanism, an endless chain track, a driving sprocket wheel therefor, a blank idler wheel for said chain, a movable support for said idler wheel, a roller to support the upper run of the chain at a point adjacent to the idler wheel, and a forked arm fixed relatively to said movable support for supporting the roller.

8. In a tractor truck mechanism, an endless chain track, a driving sprocket wheel therefor, a blank idler wheel for said chain, a movable support for said idler wheel, a roller on opposite sides of the idler wheel to engage with the upper run of the chain, and supporting means for said rollers fixed relatively to the movable support.

9. In a tractor, a main frame, an endless chain track made up of a series of articulated link sections, comprising each parallel side bars, gudgeon blocks between the side bars of alternate links, pins in said blocks for connecting the intermediate links thereto, a rear driving sprocket wheel for the chain, the teeth of which are engaged by said gudgeon blocks, a front blank idler wheel for the chain, the rim of which is straddled by the side bars of the links and contacted by the gudgeon blocks, a rocking truck frame for supporting the main frame and upon which said idler wheel is journaled, and means engaging the bottom edges of the side bars of the links on the upper run of the chain at a point adjacent to the central point of the upper portion of the idler wheel and fixed relatively to the idler wheel journal whereby the links of the chain are made to engage tangentially with the idler wheel.

10. In a tractor, a main frame, an endless chain track made up of a series of articulated link sections, comprising each parallel side bars, gudgeon blocks between the side bars of alternate links, pins in said blocks for connecting the intermediate links thereto, a rear driving sprocket wheel for the chain, the teeth of which are engaged by said gudgeon blocks, a front blank idler wheel for the chain, the rim of which is straddled by the side bars of the links and contacted by the gudgeon blocks, a rocking truck frame for supporting the main frame and upon which said idler wheel is journaled, and means engaging the bottom edges of the side bars of the links on the upper run of the chain at a point adjacent to the central point of the upper portion of the idler wheel and fixed relatively to said truck frame, whereby the links of the chain are made to engage tangentially with the idler wheel, said means comprising a pair of spaced rollers, one on each side of the idler wheel, and supporting means for said roller.

11. In a tractor, a main frame, an endless chain track made up of a series of articulated link sections, comprising each parallel side bars, gudgeon blocks between the side bars of alternate links, pins in said blocks for connecting the intermediate links thereto, a rear driving sprocket wheel for the chain, the teeth of which are engaged by said gudgeon blocks, a front blank idler wheel for the chain, the rim of which is straddled by the side bars of the links and contacted by the gudgeon blocks, a rocking truck frame for supporting the main frame and upon which said idler wheel is journaled, means engaging the bottom edges of the side bars of the links on the upper run of the chain at a point adjacent to the central point of the upper portion of the idler wheel and fixed relatively to said truck frame, whereby the links of the chain are made to engage tangentially with the idler wheel, said means comprising a pair of spaced rollers, one on each side of the idler wheel, a standard upon which said rollers are journaled, and a forked arm for supporting the standard on the said arm being connected rigidly to the journal bearings of the idler-wheel.

12. In a tractor, a main frame, an endless chain track made up of a series of articulated link sections, comprising each parallel side bars, gudgeon blocks between the side bars of alternate links, pins in said blocks for connecting the intermediate links thereto, a rear driving sprocket wheel for the chain, the teeth of which are engaged by said gudgeon blocks, a front blank idler wheel for the chain, the rim of which is straddled by the side bars of the links and contacted by the gudgeon blocks, a rocking truck frame for supporting the main frame and upon which said idler wheel is journaled, means engaging the bottom edges of the side bars of the links on the upper run of the chain at a point adjacent to the central point of the upper portion of the idler wheel and fixed relatively to said truck frame, whereby the links of the chain are made to engage tangentially with the idler wheel, said means comprising a pair of spaced rollers, one on each side of the idler wheel, a standard upon which said rollers are journaled, a forked arm for supporting the standard on the said arm being connected rigidly to the journal boxes of the idler wheel, and a push-rod connected to the forked arm and having a flexible joint connection with the roller truck frame.

13. In a tractor, a main frame, an endless chain track made up of a series of articulated link sections, comprising each parallel side bars, gudgeon blocks between the side bars of alternate links, pins in said blocks for connecting the intermediate links thereto, a rear driving sprocket wheel for the chain, the teeth of which are engaged by said gudgeon blocks, a front blank idler wheel for the chain, the rim of which is straddled by the side bars of the links and contacted by the gudgeon blocks, a rocking truck frame for supporting the main frame and upon which said idler wheel is journaled, a forked arm connected rigidly with the journal boxes of the idler wheel, and means carried by said arm to support the upper run of the track at a point overlying the upper portion of the idler wheel.

14. In a tractor of the self-laying track type, the combination of front and rear track-carrying wheels, the front wheel being yieldingly mounted with respect to the main frame of the tractor, an endless self-laying track passing thereover and a guide roller for the upper run of the track adjacent to the front wheel for the track so mounted as to move vertically or approximately so in accordance with the vertical movements of the front sprocket.

15. In a tractor of the self-laying track type, the combination with front and rear track-carrying wheels, the front wheel being yieldably mounted with respect to the main frame of the tractor, an endless self-laying track passing thereover and a guide roller adjacent to the front wheel for the track, means connected with the front wheel to move the latter toward and from the rear wheel to adjust the tension of the self-laying track, said guide roller mounted on said adjusting means and movable in unison with the front wheel.

In testimony whereof I have hereunto set my hand in the presence of two subscribing witnesses.

WILLIAM TURNBULL.

Witnesses:
 J. G. SMITH,
 W. F. FERGUSSON.